United States Patent

Ozaki et al.

[11] Patent Number: 6,025,872
[45] Date of Patent: Feb. 15, 2000

[54] MONITOR REGION EXTENSION MEMBER AND MOTOR VEHICLE PERIPHERAL MONITORING APPARATUS USING SAME

[75] Inventors: Toshiaki Ozaki; Takeyuki Amari; Naoto Ishikawa; Kazutomo Fujinami, all of Shizuoka, Japan

[73] Assignee: Yazaki Corporation, Tokyo, Japan

[21] Appl. No.: 08/924,959

[22] Filed: Sep. 8, 1997

[30] Foreign Application Priority Data

Sep. 9, 1996 [JP] Japan ................................. 8-237844

[51] Int. Cl.[7] .......................... H04N 13/00; H04N 13/02; H04N 7/18
[52] U.S. Cl. ................................ 348/43; 348/49; 348/61; 348/143; 348/148; 340/937; 359/837
[58] Field of Search .................... 348/61, 49, 62, 348/43, 63, 148, 150; 340/931, 937, 435; 359/431, 634, 780, 831, 837, 861, 862, 863, 864, 866; H04N 13/00, 13/02, 7/18

[56] References Cited

U.S. PATENT DOCUMENTS

| | | | |
|---|---|---|---|
| 3,501,227 | 3/1970 | Landen | 359/863 |
| 5,166,833 | 11/1992 | Shyu | 359/864 |
| 5,619,036 | 4/1997 | Salcio et al. | 250/330 |
| 5,670,935 | 9/1997 | Schofield et al. | 340/461 |
| 5,680,123 | 10/1997 | Lee | 340/937 |
| 5,844,720 | 12/1998 | Ohara et al. | 359/599 |

*Primary Examiner*—Vu Le
*Assistant Examiner*—Tung Vo
*Attorney, Agent, or Firm*—Armstrong, Westerman, Hattori, McLeland & Naughton

[57] ABSTRACT

A motor vehicle peripheral monitoring apparatus uses a monitor region extension member as optical image forming means. The monitor region extension member comprises an upper image passage part and an upper image compression part. The upper image passage part includes a prism structural element of substantially a semi-conical shape whose prism apical angles become the maximum angle at the center of the member and are decreased toward the extremity from the center of the member. The upper image compression part includes a cylindrical structural element having a curved surface whose angles are set to be smaller continuously from the prism apical angles of the upper image passage part.

11 Claims, 9 Drawing Sheets

SECTION S-S

FIG. 1D

SECTION T-T

MONITOR REGION EXTENSION MEMBER AND MOTOR VEHICLE PERIPHERAL MONITORING APPARATUS USING SAME

BACKGROUND OF THE INVENTION

1. Field of the Invention

The present invention relates to a monitor region extension member which is an optical member for acquiring, when image input means are used to acquire optical images of a monitor region surrounding a motor vehicle, optical images of an extended monitor region which is a predetermined region surrounding the monitor region, in addition to the optical images of the monitor region, and relates to a motor vehicle peripheral monitoring apparatus using the monitor region extension member to monitor a peripheral region of a motor vehicle which is difficult for the driver to view.

2. Description of the Related Art

Figure 12A:
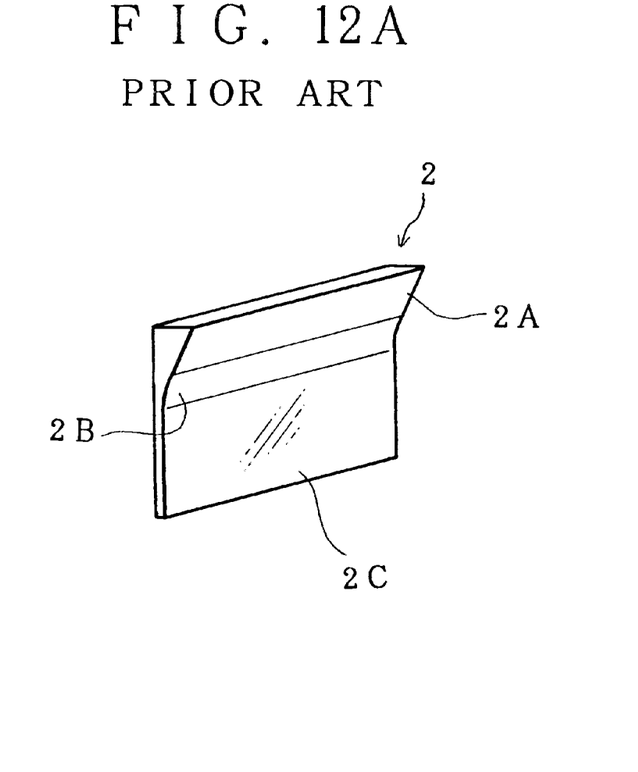
FIG. 12A is a perspective view for explaining the monitor region extension member of the prior art.
Figure 12B:
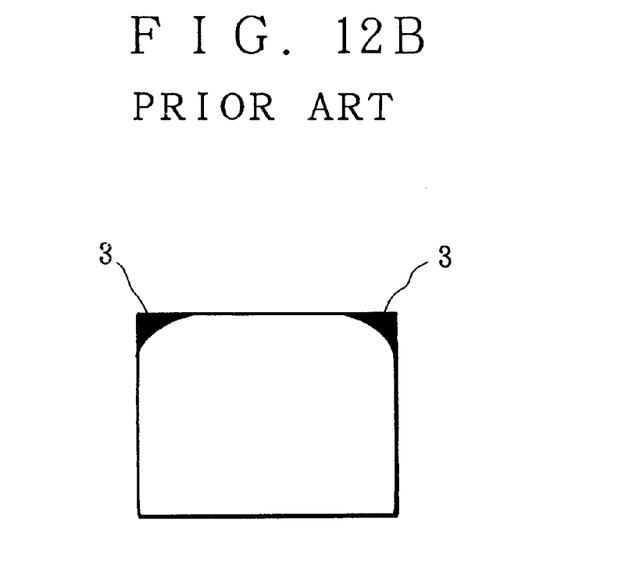
FIG. 12B is a diagram for explaining the shaded portion which may occur in a picture formed by the CCD camera.

FIG. 12A is a perspective view for explaining the monitor region extension member of the prior art, and FIG. 12B is a diagram for explaining the shaded portion which may occur in a picture formed by the CCD camera.

Known as the prior art for extending the monitor region for the back monitor are ones of types shown in FIGS. 12A, 12B, 13A, and 13B.

As shown in FIG. 12A, such a type of conventional monitor region extension member 2 and the motor vehicle peripheral monitoring apparatus using the same were constructed as an apparatus for monitoring the periphery, especially lateral sides and backward, which are difficult for the driver to view, of a motor vehicle such as an automobile, a bus or a truck.

In order to provide an apparatus for imparting information on the peripheral region to the driver, for instance, on the rear part of the motor vehicle there was mounted an image forming device such as a CCD camera for imaging the backward of the motor vehicle. The peripheral region was imaged by the image forming device and the thus formed images were displayed on a monitor or the like.

To secure an enhanced safety, it would be useful for such a motor vehicle peripheral monitoring apparatus to extend the imaged region to enlarge the region to be monitored.

For this reason, in the conventional motor vehicle peripheral monitoring apparatus, a monitor region extension member 2 for extending the monitor region was fixedly disposed immediately in front of a lens 4 of the CCD camera.

The monitor region extension member 2 comprised as shown in FIG. 12A a prism portion 2A in the form of a prism with a curvature through which images of a first predetermined region containing an extended monitor region optically pass into the lens 4 of the CCD camera, a curved portion 2B for optically compressing images of a second predetermined region continuous with the monitor region side of the first predetermined region and inputting the thus compressed images into the lens 4 of the CCD camera, and a planar portion 2C for facilitating handling of the monitor region extension member 2 by removing the sharp edges from the monitor region extension member 2.

Furthermore, in the monitor region extension member 2, the prism portion 2A was formed from a prism having a constant prism apical angle. The curved portion 2B was comprised of a cylindrical surface whose prism apical angle is set to be smaller continuously from the prism apical angle of the prism portion 2A.

By utilizing the refracting effect of the prism, the motor vehicle peripheral monitoring apparatus using the thus constructed monitor region extension member 2 was able to extend the monitor region for a single CCD camera upward from the center, with the aid of a prism with a curvature (that is, the prism portion 2A) as shown in FIG. 12A inserted into the optical system of the CCD camera, where the monitor region is a region extending far from the rear vicinity of the motor vehicle and the extended monitor region is a rear far regionoutside the monitor region. Furthermore, the curved portion 2B was able to optically compress images of a region continuous with the rear far region but excluding the rear near region, and to input them into the lens 4 of the CCD camera.

Figure 13A:
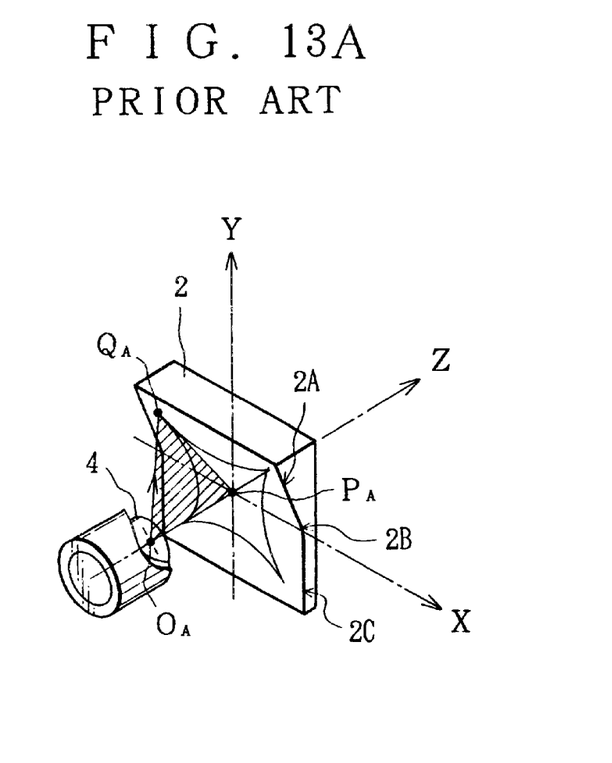
FIG. 13A is a perspective view for explaining the optical positional relationship between the monitor region extension member of FIGS. 12A and 12B and the CCD camera.
Figure 13B:
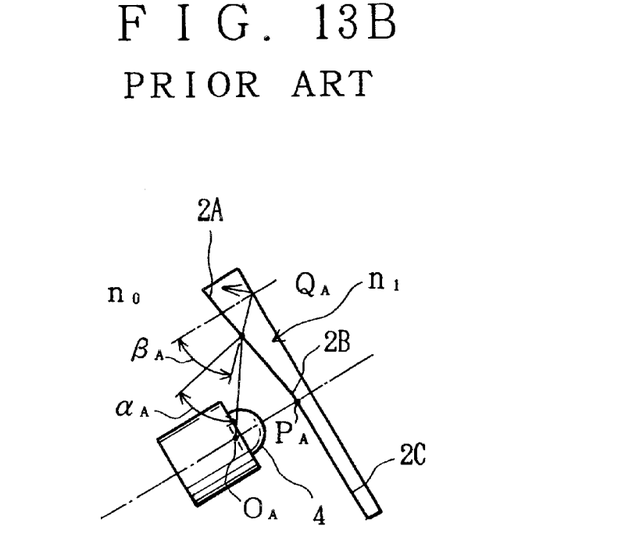
FIG. 13B is a sectional view taken along a line QA–PA in FIG. 13A.

FIG. 13A is a perspective view for explaining the optical positional relationship between the monitor region extension member of FIGS. 12A and 12B and the CCD camera, and FIG. 13B is a sectional view taken along a line $Q_A–P_A$ in FIG. 13A.

In such a monitor region extension member 2 and the motor vehicle peripheral monitoring apparatus using the same, as shown in FIG. 13A, it was possible to increase the field angle $\theta_{MAX}$ in the diagonal direction (that is, the direction of axis $Q_A–P_A$) relative to the field angle $\theta_{MIN}$ in the vertical direction (that is, the direction of Y-axis) at the central portion.

That is, it was possible to extend the monitor region since there could be increased the angle of incidence $\beta_A$ of ray output from the prism portion 2A toward the lens 4 as shown in FIG. 13B.

In general, due to the existence of optical distortion in the lens 4 of the CCD camera, the actual image forming position appears closer to the center of the lens 4 accordingly as the image forming position comes away from the central axis (that is, optical axis) of the lens 4.

More specifically, in the imaging test using a lattice plate having square lattices (a lattice pattern), the field angle became larger accordingly as it came away from the center of the lens 4, with the result that the images (in this case, imaging of the lattice pattern) obtained by the CCD camera was optically converted into pictures which were bulged in both vertical and horizontal directions (that is, distorted pictures) compared with the actual lattice pattern.

However, a monitor region extension member 2 and the motor vehicle peripheral monitoring apparatus using the same entailed a technical deficiency in that it was possible for the field angle $\theta_{MIN}$ to extend the monitor region without causing any total reflection, but that for the field angle $\theta_{MAX}$ the input angle $\beta_A$ tends to exceed the critical angle $I_c$ (=arcsin $(n_0/n_1)$, see FIG. 13B), resulting in frequent occurrence of the total reflection.

It would also be conceivable to decrease the prism apical angle of the monitor region extension member 2 in order to eliminate the total reflection (that is, $\beta_A \leq I_c$) caused by the increase of the field angle $\theta_{MAX}$. However, this would result in a simultaneous decrease of $\theta_{MIN}$ at the central portion of the monitor region extension member 2, which would lead to a narrower monitor region at the central portion requiring widest monitor region. This is also a technical problem to be overcome.

Another technical problem lies in that the conventional monitor region extension member 2 has a function to extend the monitor region surrounding the motor vehicle as described above but has by no means a function to compensate the distortion which may occur in the lens 4, so that such an optical distortion is output intactly to the CCD camera.

A further technical problem may also arise that there occurs a difference in a sense of distance between the actual monitor region and a picture of the monitor region derived in the form of output of the CCD camera, with the result that it becomes difficult to view and recognize the position of the obstacle.

SUMMARY OF THE INVENTION

The present invention was conceived to overcome these drawbacks involved in the prior art. It is a particular object to extend the monitor region and to provide satisfactory monitor images free from any shaded portion arising from total reflection and further to further provide satisfactory monitor images which are fully distinguishable with substantially no difference in a sense of distance between the actual monitor region and a picture of the monitor region derived in the form of output of the CCD camera through the compensation of optical distortion, thereby providing an improved viewing environment to the driver, by means of a monitor region extension member and of a motor vehicle peripheral monitoring apparatus using the monitor region extension member an optical image forming means, the monitor region extension member comprising an upper image passage part and an upper image compression part, the upper image passage part including a prism structural element of substantially a semi-conical shape whose prism apical angle becomes the maximum angle at the center of the member and is decreased toward the extremity of the member from the center of the member, the upper image compression part including a cylindrical structural element having a curved surface whose angle is so set as to become smaller continuously from the prism apical angle of the upper image passage part According to a first aspect of the present invention, there is provided a monitor region extension member which is an optical member for acquiring, when image input means are used to acquire optical images of a monitor region surrounding a motor vehicle, optical images of an extended monitor region which is a predetermined region surrounding the monitor region, in addition to the optical images of the monitor region, the monitor region extension member comprising an upper image passage part in the form of a prism disposed at the upper portion of the member, for optically refracting images of a first predetermined region containing at least the extended monitor region to acquire optical images of the first predetermined region; and an upper image compression member in the form of a cylindrical prism disposed continuously with the upper image passage part, for optically refracting images of a second predetermined region continuous with the first predetermined region to acquire optical images of the second predetermined region.

In accordance with the first aspect of the present invention, by providing the upper image passage part and the upper image compression part, there is ensured an extension of the monitor region as well as a provision of satisfactory monitor images free from any shaded portion arising from total reflection, so that the driver can be given an improved viewing environment.

Furthermore, by optically continuously coupling the upper image passage part with the upper image compression part there is ensured a provision of continuous monitor images free from any blind spot, so that the driver can be given an improved viewing environment.

Furthermore, there can be obtained monitor images which are highly distinguishable with substantially no difference in a sense of distance between the actual monitor region and a picture of the monitor region derived in the form of output of the CCD camera through the compensation of the horizontal optical distortion. As a result of this, the driver can be given an improved viewing environment.

According to a second aspect of the present invention, there is provided a monitor region extension member wherein the upper image passage part includes a prism structural element of substantially a semi-conical shape whose prism apical angle becomes the maximum angle at the center of the member and is decreased toward the extremity of the member from the center of the member.

In accordance with the second aspect of the present invention, by providing such an upper image passage part having such a prism structural element it become possible in addition to the effect of the first aspect to secure the angle of incidence of the monitor images relative to the field angle $\theta_{MIN}$ at the central portion and to decrease the angle of incidence of the monitor images relative to the field angle $\theta_{MAX}$ in the diagonal direction.

As a result of this, there is ensured an extension of the monitor region as well as a provision of satisfactory monitor images free from any shaded portion arising from total reflection, so that the driver can be given an improved viewing environment.

Furthermore, by providing the prism structural element of substantially a semi-conical shape, there is achieved a compensation of the optical distortion in the horizontal direction, and satisfactory monitor images can be provided which are highly distinguishable with substantially no difference in a sense of distance between a picture of the monitor region derived in the form of an output of the CCD camera and the actual monitor region. As a result, an improved viewing environment can be given to the driver.

According to a third aspect of the present invention, there is provided a monitor region extension member wherein the prism apical angle is a predetermined function in which the sector angle of the prism structural element is a variable, the prism apical angle being decreased accordingly as the sector angle increases.

In accordance with the third aspect of the present invention, by providing the prism structural element having a prism apical angle capable of being expressed by a predetermined function in which the sector angle is a variable, it becomes possible in addition to the effect of the second aspect to secure an angle of incidence of a monitor image relative to a field angle at the central position and to decrease the angle of incidence of the monitor image relative to the field angle in the diagonal direction.

This will ensure an extension of the monitor region as well as a provision of satisfactory monitor images free from any shaded portion arising from total reflection.

Furthermore, there is achieved a compensation of the optical distortion in the horizontal direction, and satisfactory monitor images can be provided which are highly distinguishable with substantially no difference in a sense of distance between a picture of the monitor region derived in the form of an output of the CCD camera and the actual monitor region.

As a result of this, an improved viewing environment can be given to the driver.

According to a fourth aspect of the present invention there is provided a monitor region extension member wherein the upper image compression part includes a cylindrical structural element having a curved surface whose angle is set to be smaller continuously from the prism apical angle of the upper image passage part.

In accordance with the fourth aspect of the present invention, by providing the upper image compression part having such a cylindrical structural element with a curved surface, it becomes possible in addition to the effect of any one of the first to third aspects to further increase the angle of incident of the monitor images relative to the field angle $\theta_{MIN}$ at the central position and to facilitate a further decrease of the angle of incidence of the monitor images relative to the field angle $\theta_{MAX}$ in the diagonal direction.

As a result of this, there is ensured an extension of the monitor region with no optical distortion as well as a provision of satisfactory monitor images free from any eyesore, shaded portion arising from total reflection, so that the driver can be given an improved viewing environment.

Furthermore, by optically continuously coupling the upper image passage part with the upper image compression part there is ensured a provision of continuous monitor images free from any blind spot, so that the driver can be given an improved viewing environment.

According to a fifth aspect of the present invention there is provided a monitor region extension member wherein the curved surface formed on the upper image compression part is of a cylindrical structure in the form of a cylindrical surface whose prism apical angle is set to be smaller continuously from the prism apical angle of the image passage part.

In accordance with the fifth aspect of the present invention, by providing the upper image compression part having such a prism structural element with a cylindrical surface, it becomes possible in addition to the effect of the fourth aspects to further increase the angle of incident of the monitor images relative to the field angle $\theta_{MIN}$ at the central position and to facilitate a further decrease of the angle of incidence of the monitor images relative to the field angle $\theta_{MAX}$ in the diagonal direction.

As a result of this there is ensured an extension of the monitor region with no optical distortion as well as a provision of satisfactory monitor images free from any eyesore, shaded portion arising from total reflection, so that the driver can be given an improved viewing environment.

Furthermore, by optically continuously coupling the upper image passage part with the upper image compression part there is ensured a provision of continuous monitor images free from any blind spot, so that the driver can be given an improved viewing environment.

According to a sixth aspect of the present invention there is provided a motor vehicle peripheral monitoring apparatus using as optical image forming means the monitor region extension member, the motor vehicle peripheral monitoring apparatus comprising image input means mounted in a motor vehicle, for picking up by way of the monitor region extension member serving as optical image forming means, when acquiring optical images of the monitor region, optical images of the extended monitor region in addition to optical images of the monitor region input from the monitor region extension member, to generate motor vehicle peripheral monitor information; and data processing means for monitoring the occurrence of an obstacle in the periphery of a motor vehicle on the basis of the motor vehicle peripheral monitor information.

In accordance with the sixth aspect of the present invention, by providing such image input means and data processing means, in addition to the effect of any one of the first to fifth aspects, there is ensured an extension of the monitor region with no optical distortion as well as a provision of satisfactory monitor images free from any shaded portion arising from total reflection, so that the driver can be given an improved viewing environment.

Furthermore, by optically continuously coupling the upper image passage part with the upper image compression part there is ensured a provision of continuous monitor images free from any blind spot, so that the driver can be given an improved viewing environment.

Furthermore, there can be obtained monitor images which are highly distinguishable with substantially no difference in a sense of distance between the actual monitor region and a picture of the monitor region derived in the form of output of the CCD camera through the compensation of the horizontal optical distortion. As a result of this, the driver can be given an improved viewing environment.

According to a seventh aspect of the present invention there is provided a motor vehicle peripheral monitoring apparatus wherein the monitor region is a region extending far from the rear vicinity of the motor vehicle, with the extended monitor region being a rear far region outside the monitor region, and wherein the upper image passage part is arranged such that images of at least the rear far region are input into the image input means, and wherein upper image compression part is arranged such that it optically compresses images of regions continuous with the rear far region but excluding the rear near region to input them into the image input means.

In accordance with the seventh aspect of the present invention, by providing such an upper image passage part, it become possible in addition to the effect of the sixth aspect to secure the angle of incidence of the images of the rear far region relative to the field angle $\theta_{MIN}$ at the central portion and to decrease the angle of incidence of the images of the rear far region relative to the field angle $\theta_{MAX}$ in the diagonal direction.

Furthermore, there can be obtained monitor images which are highly distinguishable with substantially no difference in a sense of distance between the actual monitor region and a picture of the monitor region derived in the form of output of the CCD camera through the compensation of the horizontal optical distortion. As a result of this, the driver can be given an improved viewing environment.

Similarly, by arranging the upper image compression part, it becomes possible to secure the angle of incidence of images of a wider area extending from the rear far region up to the rear near region, relative to the field angle $\theta_{MIN}$ at the central position and to decrease the angle of incidence of images of a wider area extending from the rear far region up to the rear near region, relative to the field angle $\theta_{MAX}$ in the diagonal direction.

As a result, there is ensured an extension of the monitor region with no optical distortion as well as a provision of satisfactory monitor images free from any shaded portion arising from total reflection, so that the driver can be given an improved viewing environment. Furthermore, there can be provided continuous monitor images with no blind spot, with the result that an improved viewing environment can be given to the driver.

According to an eighth aspect of the present invention there is provided a motor vehicle peripheral monitoring apparatus wherein the prism structural element of the upper image passage part on the side of the image input means includes substantially convexedly or conically curved surface whose prism apical angle is decreased toward the extremity of the member in a predetermined rate.

In accordance with the eighth aspect of the present invention, by providing such an upper image passage part having the prism structural element with convexedly or conically curved surface, there is ensured, in addition to the effect of the seventh aspect, an acquisition of images with less optical distortion over a wider monitor region.

Furthermore, it becomes possible for the thus acquired images with less optical distortion to secure the angle of incidence of the field angle $\theta_{MIN}$ at the central position and to decrease the angle of incidence of the field angle $\theta_{MAX}$ in the diagonal direction.

As a result, there is ensured an extension of the monitor region with no optical distortion as well as a provision of satisfactory monitor images free from any shaded portion arising from total reflection, so that the driver can be given an improved viewing environment.

Furthermore, there can beobtained monitor images which are highly distinguishable with substantially no difference in a sense of distance between the actual monitor region and a picture of the monitor region derived in the form of output of the CCD camera through the compensation of the horizontal optical distortion. As a result of this, the driver can be given an improved viewing environment.

According to a ninth aspect of the present invention there is provided a motor vehicle peripheral monitoring apparatus wherein the cylindrical structural element of the upper image compression part on the side of the image input means includes a curved surface concaved toward the image input means.

In accordance with the ninth aspect of the present invention, by providing such an upper image compression part having the cylindrical structural element with the concavely curved surface, there is ensured, in addition to the effect of the seventh or eighth aspect, an acquisition of images with less optical distortion over a wider monitor region.

Moreover, it becomes possible for the thus acquired images with less optical distortion to secure the angle of incidence of the field angle $\theta_{MIN}$ at the central position and to decrease the angle of incidence of the field angle $\theta_{MAX}$ in the diagonal direction.

As a result, there is ensured an extension of the monitor region with no optical distortion as well as a provision of satisfactory monitor images free from any shaded portion arising from total reflection, so that the driver can be given an improved viewing environment.

According to a tenth aspect of the present invention there is provided a motor vehicle peripheral monitoring apparatus further comprising a back gear detection sensor for detecting that a speed change gearing mechanism is at a back gear position to generate a detection signal; and a signal acquisition unit for outputting, upon a detection of the back gear position, the detection signal to the data processing means to urge the peripheral monitor control.

In accordance with the tenth aspect of the present invention, in addition to the effect of the ninth or tenth aspect, the provision of such a signal acquisition part will facilitate the automatization of the peripheral monitor control, with the result that the driver can be given the motor vehicle peripheral monitoring apparatus having an improved operativity.

According to an eleventh aspect of the present invention there is provided a motor vehicle peripheral monitoring apparatus further comprising a display alarm unit for generating a buzzer sound or a voice guidance on the basis of a drive signal output from the data processing means and for displaying a relative position between an obstacle and the motor vehicle or a message to the driver.

In accordance with the eleventh aspect of the present invention, by providing such a display alarm unit, in addition to the effect of the ninth or tenth aspect, there is promptly and simply ensured the finding of an obstacle in the peripheral monitoring operation and the identification of the relative positions.

As a result of this, the burden of monitoring of the driver can be alleviated so that the driver can be given an operative environment allowing an accurate peripheral monitoring.

BRIEF DESCRIPTION OF THE DRAWINGS

The above and other aspects, objects, features and advantages of the present invention will become more apparent from the following detailed description in conjunction with the accompanying drawings, in which.

DESCRIPTION OF THE PREFERRED EMBODIMENTS

Preferred embodiments of the present invention will now be described with reference to the accompanying drawings.

Figures 1A, 1B:
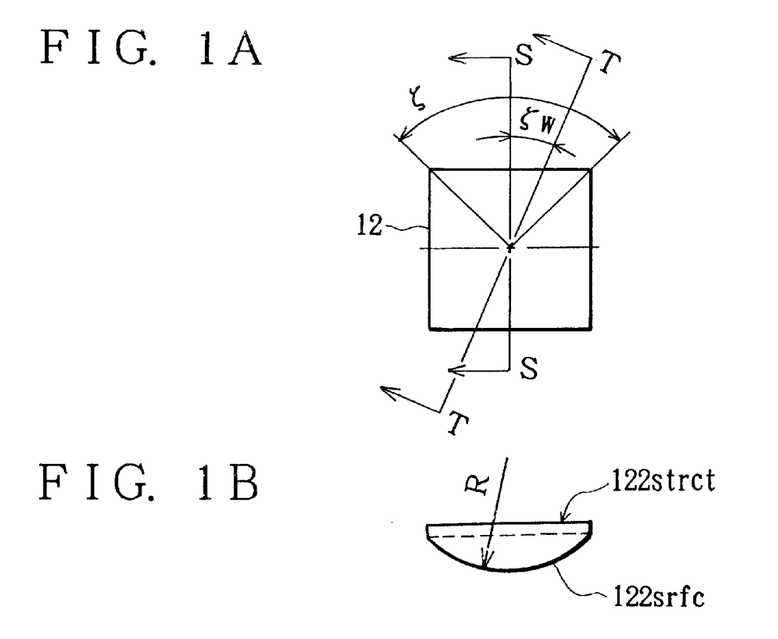
FIG. 1A is a front elevational view illustrating an embodiment of a monitor region extension member of the present invention.
FIG. 1B is a top plan view of FIG. 1A.
Figure 1C:
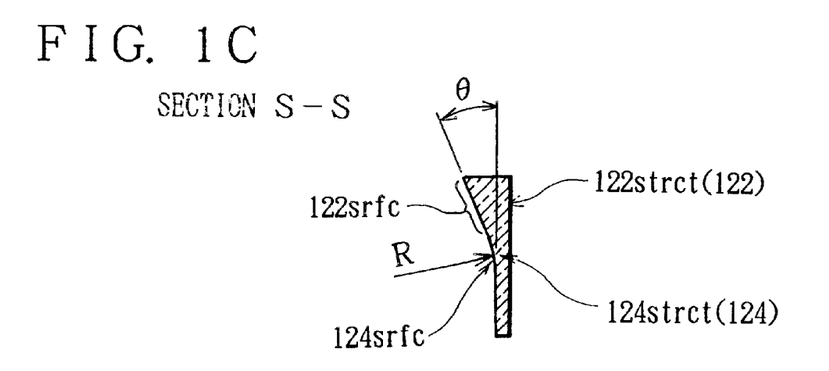
FIG. 1C is a sectional view taken along a line S—S of FIG. 1A.
Figure 1D:
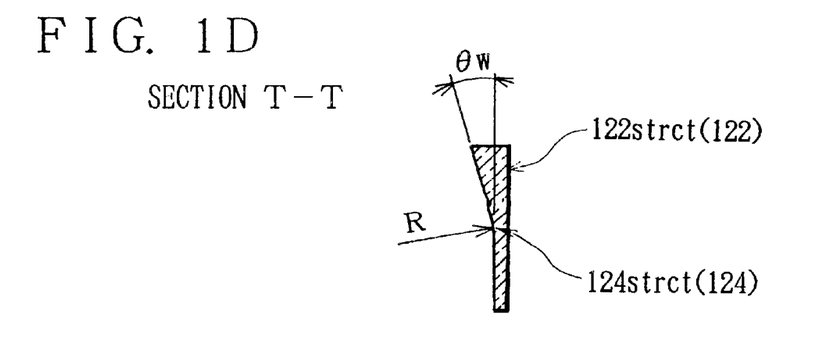
FIG. 1D is a sectional view taken along a line T—T of FIG. 1A.

FIG. 1A is a front elevational view illustrating an embodiment of a monitor region extension member 12 of the present invention, FIG. 1B is a top plan view of FIG. 1A, FIG. 1C is a sectional view taken along a line S—S of FIG. 1A, and FIG. 1D is a sectional view taken along a line T—T of FIG. 1A.

The monitor region extension member 12 is an optical member which, when a motor vehicle peripheral monitoring apparatus 50 described later acquires via image input means optical images of a monitor region 200 surrounding a motor vehicle 100 such as a bus or a truck, serves to acquire optical images of, in addition to the monitor region 200, an extended monitor region 200(F) which is a predetermined region surrounding the monitor region 200. The monitor region extension member 12 comprises an upper image passage part 122, an upper image compression part 124 and a planar part 126 which are domains through which images optically pass.

The upper image passage part 122 is in the form of a prism which is located at the upper portion of the monitor region extension member 12 as shown in FIGS. 1A and 1B and serves to optically refract images of a first predetermined region 200(C) (which will be described later; see FIG. 11) containing at least the extended monitor region 200(F) (which will be described hereinbelow; see FIG. 11) to acquire optical images of the first predetermined region 200(C).

Figure 2:
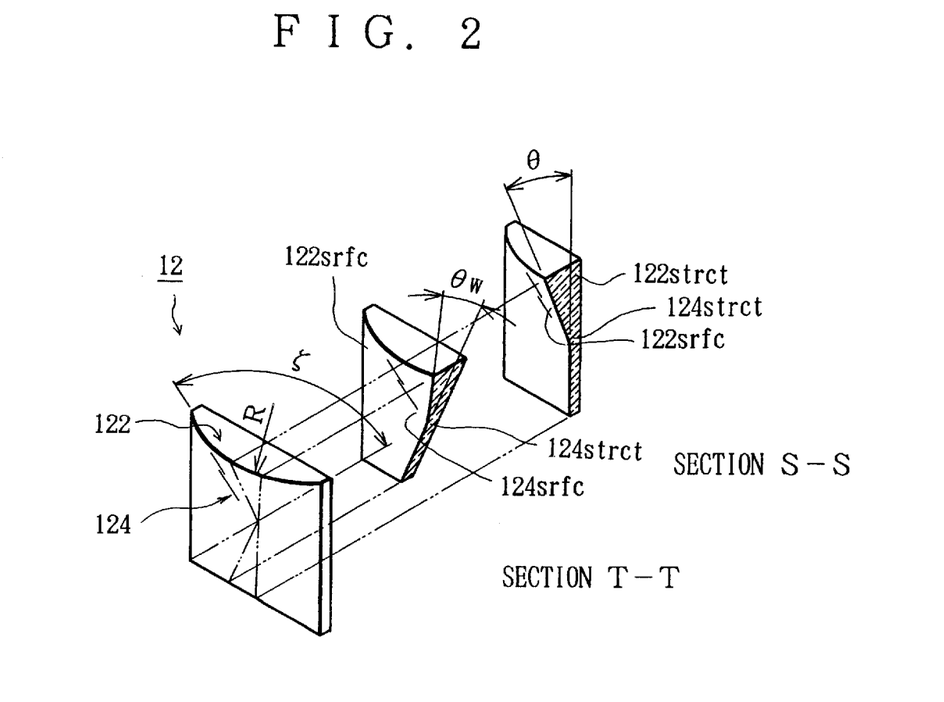
FIGS. 2 are perspective views of the monitor region extension member of FIG. 1, which include views associated with the section T—T or S—S of FIG. 1A.

FIG. 2 are perspective views of the monitor region extension member 12 of FIG. 1, which includes perspective views associated with the section T—T or S—S of FIG. 1A.

The upper image passage part 122 has a prism structural element $122_{strct}$ of substantially a semi-conical shape in which a prism apical angle $\theta_w$ (i.e., an angle (degrees) at the apex of the prism, which is represented as an angle formed between a curved surface $122_{srfc}$ of the upper image passage part 122 and the planar part 126) results in its maximum angle (i.e., θ (degrees) at the center (a position $\zeta_w$=0 (degrees)) of the monitor region extension member 12 as shown in FIGS. 1C and 2 and in which the prism apical angle $\theta_w$ is reduced toward the extremity (a position $\zeta_w$=ζ (degrees)) of the monitor region extension member 12 starting from its center as shown in FIGS. 1D and 2 (in other words, with the increased $\zeta_w$ from the center shown in FIG. 1A).

More specifically, when a CCD camera 11 has a view angle $\theta_1$ of 90 degrees, the upward monitoring angle of the upper image passage part 122 is enlarged from 45 degrees to 65 degrees due to a prism insertion effect. Setting the prism apical angle $\theta_1$ at 20 degrees will widen the monitor region by 20 degrees.

The contour of the curved surface $122_{srfc}$ of the prism structural element $122_{strct}$ can be determined by a radius of curvature R shown in FIGS. 1B and 2.

Figure 3:
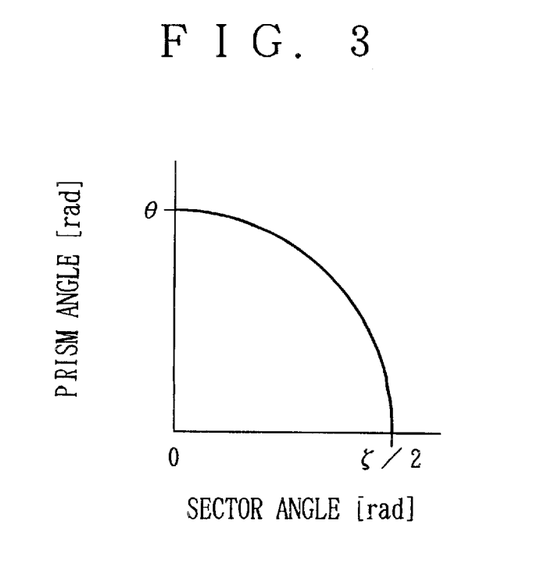
FIG. 3 is a graphical representation for explaining a functional relationship between a sector angle $\zeta_w$ and the prism apical angle $\theta_w$ of the monitor region extension member shown in FIGS. 1A to 1D.

FIG. 3 is a graphical representation for explaining a functional relationship between a sector angle $\zeta_w$ and the prism apical angle $\theta_w$ of the monitor region extension member 12 shown in FIGS. 1A to 1D.

The prism apical angle $\theta_w$ is a predetermined function in which the sector angle $\zeta_w$ of the prism structural element $122_{strct}$ is a variable as shown in FIG. 3, and it is desirable that the prism apical angle $\theta_w$ be set so that it is decreased accordingly as the sector angle $\zeta_w$ increases.

In this manner, by providing the prism structural element $122_{strct}$ having a prism apical angle $\theta_w$ capable of being expressed by a predetermined function in which the sector angle $\zeta_w$ is a variable, it becomes possible to secure an angle of incidence of a monitor image relative to a field angle $\theta_{MIN}$ at the central position and to decrease the angle of incidence of the monitor image relative to the field angle $\theta_{MAX}$ in the diagonal direction.

This will ensure an extension of the monitor region 200 as well as a provision of satisfactory monitor images free from any shaded portion arising from total reflection.

Furthermore, there is achieved a compensation of the optical distortion in the horizontal direction, and satisfactory monitor images can be provided which are highly distinguishable with substantially no difference in a sense of distance between a picture of the monitor region 200 derived in the form of an output of the CCD camera 11 and the actual monitor region 200. As a result of this, an improved viewing environment can be given to the driver.

More specifically, the curved surface $122_{srfc}$ of the prism structural element $122_{strct}$ is preferably so contoured that the prism apical angle $\theta_w$ is set to be large at the central position (i.e., the section S—S) as shown in FIG. 2 and that the prism apical angle $\theta_w$ is set to be zero degree at the extremity (i.e., the section T—T) of the member, $\zeta_w$=ζ/2 with the gradually decreased prism apical angle $\theta_w$ toward the extremity of the member in response to the sector angle $\zeta_w$ from the central position as shown in FIG. 2.

Figure 4:
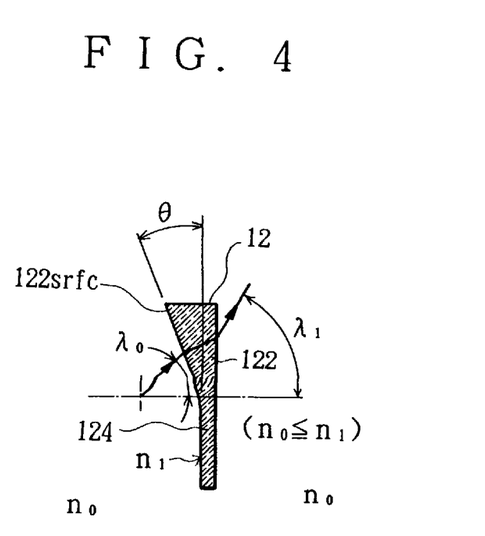
FIG. 4 illustrates an optical path of an image of the monitor region 200 incident on the center (i.e., $\theta_w=\theta$) of the monitor region extension member of FIGS. 1A to 1D.

FIG. 4 illustrates an optical path of an image of the monitor region 200 incident on the center (i.e., $\theta_w$=θ) of the monitor region extension member 12 of FIG. 1.

As regards region images which have optically passed through the upper image passage part 122, as shown in FIG. 4, the entire region images are shifted due to refracting function of the upper image passage part 122 ($n_0 \leq n_1$, where $n_0$=refractive index of air, $n_1$=refractive index of the upper image passage part 122) to enter the CCD camera 11. More specifically, an image incident on the upper image passage part 122 at an angle $\lambda_0$ is shifted to a predetermined direction at an exit angle $\lambda_1$ due to the refracting function of the upper image passage part 122.

By providing such an upper image passage part 122 having the prism structural element $122_{strct}$, it becomes possible to secure an angle of incidence of a monitor image relative to a field angle $\theta_{MIN}$ at the central position and to decrease an angle of incidence of the monitor image relative to a field angle $\theta_{MAX}$ in the diagonal direction.

This will ensure an extension of the monitor region 200 as well as a provision of satisfactory monitor images free from any eyesore, shaded portion 3 (see FIG. 12B) which has hitherto occurred arising from total reflection (that is, angle of incidence $\beta_A \leq$ critical angle Ic). As a result of this, an improved viewing environment can be given to the driver.

It is to be noted herein that the critical angle=arcsin (refractive index $n_0$ of air/refractive index n1 of monitor region extension member 12), with $n_0 \leq n_1$, and the angle of incidence a $\alpha_A = \theta_{MAX}$.

Furthermore, by providing the prism structural element $122_{strct}$ of substantially a semi-conical shape, there is achieved a compensation of the optical distortion in the horizontal direction, and satisfactory monitor images can be provided which are highly distinguishable with substantially no difference in a sense of distance between a picture of the monitor region 200 derived in the form of an output of the CCD camera 11 and the actual monitor region 200. As a result, an improved viewing environment can be given to the driver.

The upper image compression part 124 is comprised of a prism which is disposed continuous with the upper image passage part 122 as shown in FIGS. 1A and 2 and serves to optically refract images of a second predetermined region 200(B) continuous with the first predetermined region 200 (C) to acquire optical images of the second predetermined region 200(B).

The upper image compression part 124 includes a cylindrical structural element $124_{strct}$ having a curved surface which has been set to be of a small angle continuous with the prism apical angle $\theta_w$ of the upper image passage part 122.

The contour of the curved surface of the cylindrical structural element $124_{strct}$ can be determined by a radius of curvature R shown in FIGS. 1C, 1D, and 2.

As regards region images which have optically passed through the upper image compression part 124, the region images are input into the CCD camera 11 in a seamlessly continuous condition and in such a manner that they have been wholly optically compressed, by virtue of the refractive function of the upper image compression part 124.

By providing such a cylindrical structural element $124_{strct}$ having a curved surface there is ensured an extension of the monitor region 200 as well as a provision of satisfactory monitor images free from any shaded portion arising from total reflection, with the result that an improved viewing environment can be given to the driver.

By optically continuously coupling the upper image passage part 122 with the upper image compression part 124 there is ensured a provision of continuous monitor images free from any blind spot, with the result that an improved viewing environment can be given to the driver.

Furthermore, there can be obtained monitor images which are highly distinguishable with substantially no difference in a sense of distance between the actual monitor region 200 and a picture of the monitor region 200 derived in the form of output of the CCD camera 11 through the compensation of the optical distortion. As a result of this, an improved viewing environment can be given to the driver.

It is to be appreciated that the curved surface provided on the upper image compression part 124 is preferably comprised of the cylindrical structural element $124_{strct}$ having a cylindrical surface whose prism apical angle is continuously decreased starting from the prism apical angle of the image passage part. By providing such an upper image compression part 124 including the cylindrical structural element $124_{strct}$ with a cylindrical surface, it becomes possible to facilitate a further increase of the angle of incidence of the monitor images relative to the field angle $\theta_{MIN}$ at the central position as well as a further decrease of the angle of incidence of the monitor images relative to the field angle $\theta_{MAX}$ in the diagonal direction. Thus, there is ensured an extension of the monitor region 200 as well as a provision of satisfactory monitor images free from any shaded portion arising from total reflection, with the result that an improved viewing environment can be given to the driver. Furthermore, by optically continuously coupling the prism structural element $122_{strct}$ with the cylindrical structural element $124_{strct}$ there is ensured a provision of continuous monitor images freefrom any blind spot, with the result that an improved viewing environment can be given to the driver.

The planar part 126 is an optical component which has no optical function but removes any sharp edges from the monitor region extension member 12 to facilitate handling of the monitor region extension member 12.

Thus, the images which have optically passed through the planar part 126 are input into the CCD camera without being affected by the monitor region extension member 12.

Formed on an image plane are images which have been shifted by the optical transmission through the upper image passage part 122, images which have been compressed by the optical transmission through the upper image compression part 124, and images which have optically passed through the planar part 126. The thus formed images are shifted images, so that clear and sharp images are acquired.

Figures 5A, 5B:
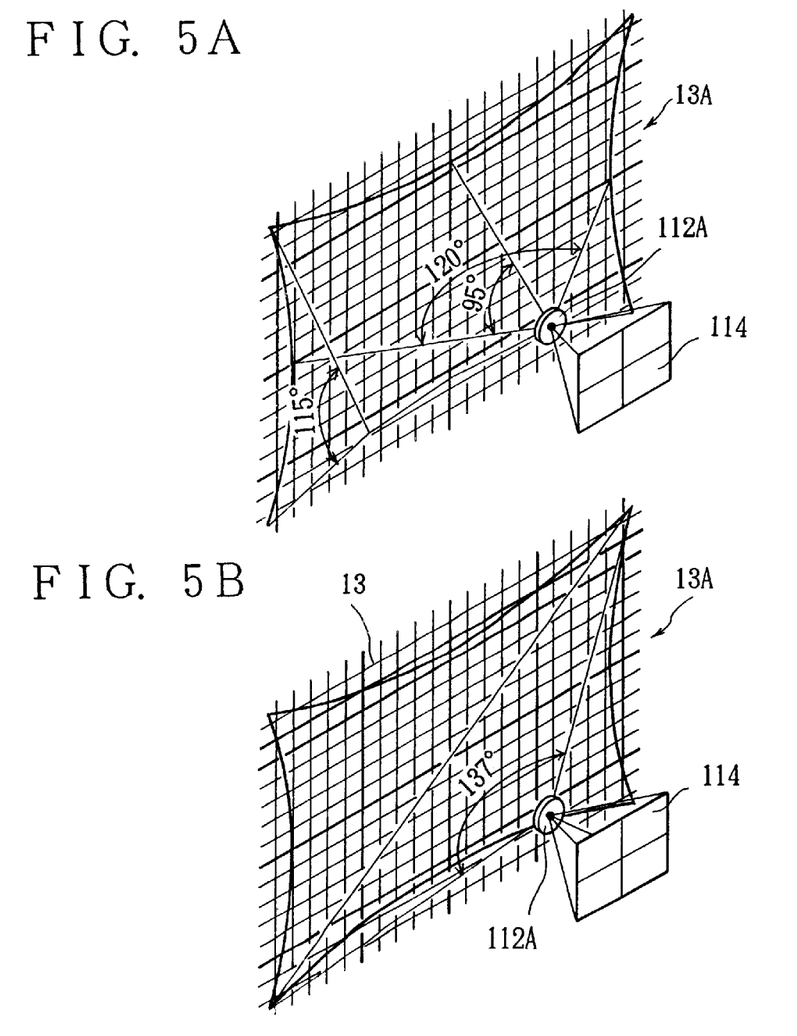
FIGS. 5A and 5B are layouts for explaining optical positional relationship in an imaging test using only the CCD camera.
Figure 5C:
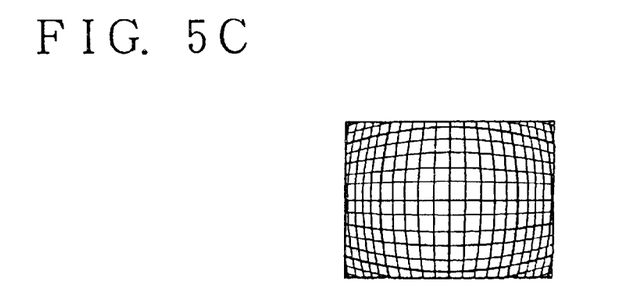
FIG. 5C illustrates a lattice pattern for explaining the distortion in a picture formed by the CCD camera as a result of the imaging test using a lattice plate.

FIGS. 5A and 5B are layouts for explaining optical positional relationship in an imaging test using only the CCD camera 11, and FIG. 5C illustrates a lattice pattern for explaining the distortion in a picture formed by the CCD camera 11 as a result of the imaging test using a lattice plate.

The imaging test is preferably carried out by projecting optical images on the lattice plate 13 having vertical and horizontal lattices 13A in a regular square pattern as shown in FIGS. 5A and 5B, onto CCD elements 114 within the CCD camera 11 to allow the CCD elements 114 to read them, and displaying picture signals output from the CCD element 114 at that time onto a monitor. It is to be understood that the imaging test is not intended to be limited to this and that test patterns other than the square lattice pattern are also available.

Due to the distortion generally existing in a lens 112A of the CCD camera 11, the actual image forming position appears closer to the center of the lens 11A accordingly as the image forming position comes away from the central axis (namely, the optical axis) of the lens 112A.

More specifically, in the case of carrying out the imaging test using the lattice plate having square lattices (a lattice pattern), the field angle becomes larger accordingly as it comes away from the center of the lens 112A, with the result that images obtained in the CCD camera 11 (in this case, imaging of the lattice pattern) are optically converted into pictures which have bulge out in both the vertical and horizontal directions (namely, distorted pictures) compared with the actual lattice pattern.

For example, as regards the field angles of the monitor region 200 obtained from a combination of a ⅓ inch CCD camera 11 and a lens 112A with a focal length f=2.1 mm, the field angle in the vertical direction at the central portion is 95 degrees as shown in FIG. 5A, and the field angles in the horizontal and diagonal directions are 120 degrees and 137 degrees, respectively, as shown in FIG. 5B.

An image projected on the CCD elements 114 results in a distorted image as shown in FIG. 5C due to the above-described distortion. Under this condition, the field angle in the vertical direction is 115 degrees.

Since it has a function to extend the monitor region 200 surrounding the motor vehicle 100 as described above but by no means has a function to compensate the distortion which has occurred in the lens 112A, such an optical distortion is intactly output to the CCD camera 11.

Furthermore, due to such an optical distortion, there occurs a sense of distance between the actual monitor region 200 and a picture of the monitor region 200 derived in the form of an output of the CCD camera 11, thus making it difficult to recognize by eye the position of an obstacle.

Figure 6:
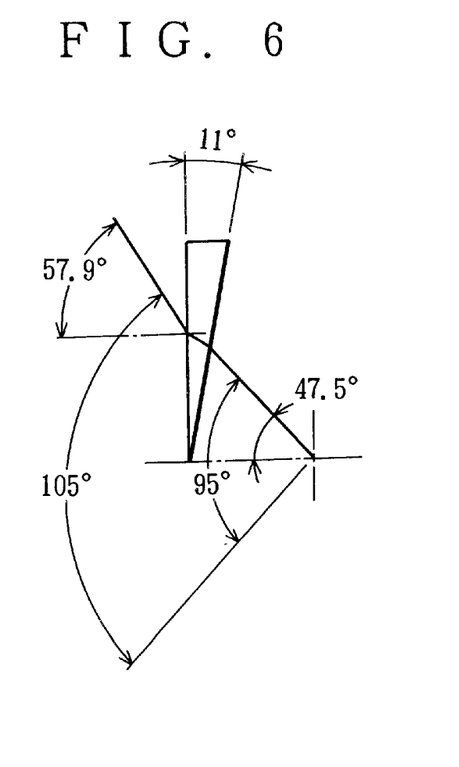
FIG. 6 is an analytical diagram of a ray for explaining an increment of the prism apical angle $\theta_w$ required to extend the monitor region.

FIG. 6 is an analytical diagram of a ray for explaining an increment of the prism apical angle $\theta_w$ required to extend the monitor region 200.

In order to upward extend by 10 degrees a monitor region 200 at the central portion of an image, as shown in FIG. 6, 11 degrees of prism apical angle $\theta_w$ is required at the central portion of the monitor region 200.

The diagonal portion of the monitor region 200 does not need any prism because the field angle in the diagonal direction is secured.

At the central portion of the monitor region 200, the vertical and horizontal field angles are set at 90 degrees and 120 degrees, respectively (see FIG. 5).

Figure 7:
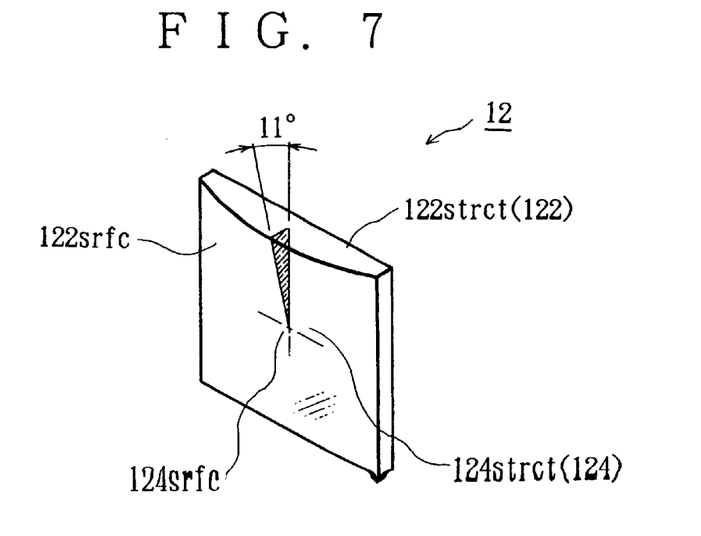
FIG. 7 is a perspective view for explaining an prism apical angle $\theta_w$ which is required for the monitor region extension member of FIGS. 1A to 1D to compensate the increment of the prism apical angle $\theta_w$ in FIG. 6.
Figure 8:
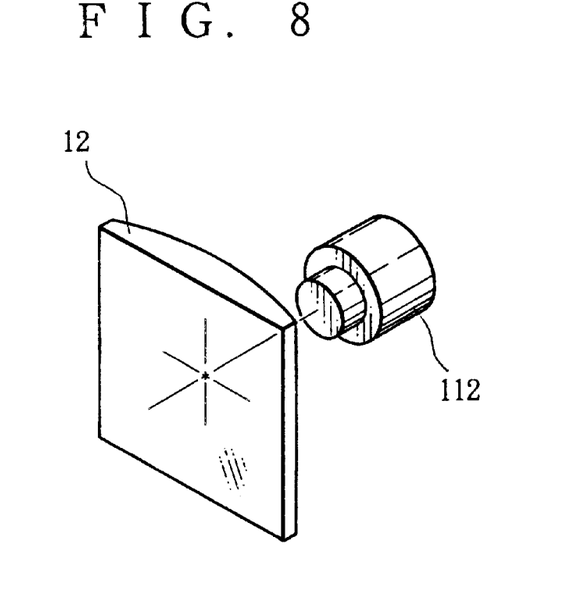
FIG. 8 is a perspective view for explaining an optical positional relationship between the monitor region extension member and the CCD camera of FIGS. 1A to 1D.

FIG. 7 is a perspective view for explaining an prism apical angle $\theta_w$ which is required for the monitor region extension member 12 of FIG. 1 to compensate the increment of the prism apical angle $\theta_w$ in FIG. 6. FIG. 8 is a perspective view for explaining an optical positional relationship between the monitor region extension member 12 and the CCD camera 11 of FIG. 1.

In this embodiment, to compensate the increment (that is, 11 degrees) of the prism apical angle $\theta_w$ at the central portion ($\zeta_w$=0 degree) in FIG. 6, the monitor region extension member 12 having the contour shown in FIG. 7 is disposed at the front part of a lens unit 112 of the CCD camera 11 in such a manner that their optical axes are coincident with each other (see FIG. 8).

Figure 9:
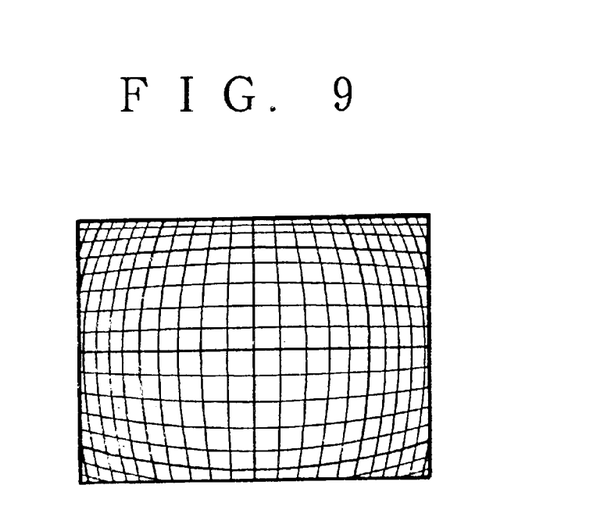
FIG. 9 illustrates a lattice pattern for explaining a decrease of the distortion in a picture formed by the CCD camera as the result of execution of imaging test using a lattice plate in the optical positional relationship of FIG. 8.

FIG. 9 illustrates a lattice pattern for explaining a decrease of the distortion in a picture formed by the CCD camera 11 as the result of execution of imaging test using a lattice plate in the optical positional relationship of FIG. 8.

By disposing such a monitor region extension member 12 at the front part of the lens unit 112 of the CCD camera 11, there is ensured an extension of the monitor region 200 as well as a simple provision of satisfactory monitor images free from any shaded portion arising from total reflection as shown in FIG. 9, so that the driver can be given an improved viewing environment.

By optically continuously coupling the upper image passage part 122 with the upper image compression part 124 there is ensured a provision of continuous monitor images free from any blind spot, so that the driver can be given an improved viewing environment.

Furthermore, there can be obtained monitor images which are highly distinguishable with substantially no difference in a sense of distance between the actual monitor region 200 and a picture of the monitor region 200 derived in the form of output of the CCD camera 11 through the compensation of the horizontal optical distortion as shown in FIG. 9. As a result of this, the driver can be given an improved viewing environment.

Figure 10:
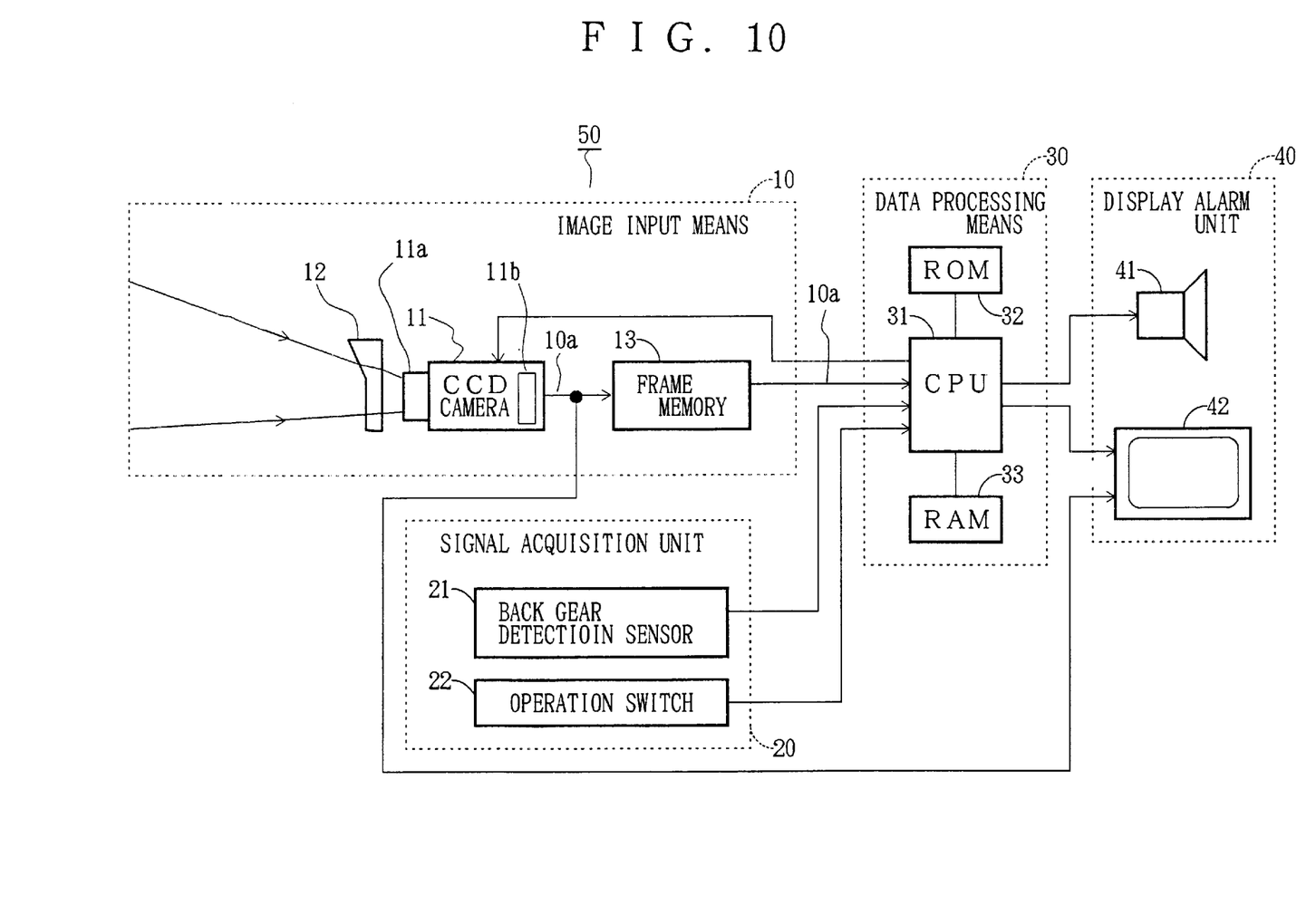
FIG. 10 is a functional block diagram for explaining a construction of the motor vehicle peripheral monitoring apparatus In accordance with the present invention.
Figure 11:
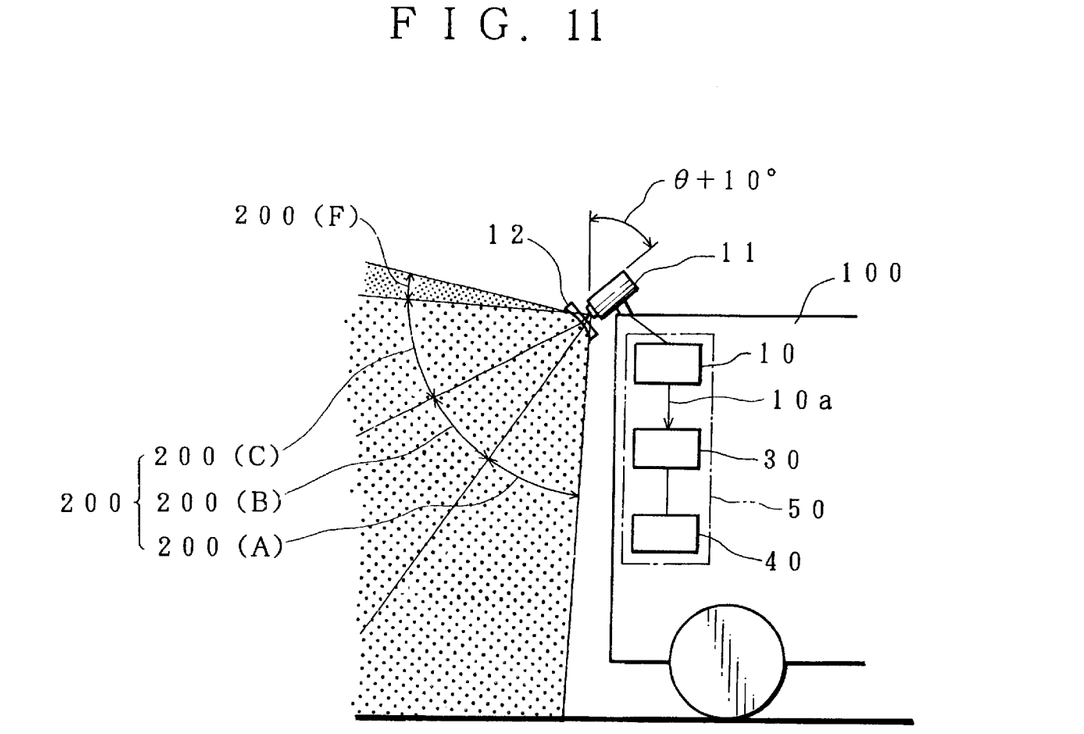
FIG. 11 is a diagram explaining the monitor region extension member, as well as the monitor region and the extended monitor region with the CCD camera mounted therein.

FIG. 10 is a functional block diagram for explaining a construction of the motor vehicle peripheral monitoring apparatus 50 In accordance with the present invention. FIG. 11 is a diagram explaining the monitor region extension member 12, as well as the monitor region 200 and the extended monitor region 200(F) with the CCD camera 11 mounted therein.

When acquiring optical images of the monitor region 200 surrounding a motor vehicle such as a bus or a truck with the aid of the monitor region extension member 12 and the image input means 11, the motor vehicle peripheral monitoring apparatus 50 functions to acquire optical images of not only the monitor region 200 but also of the extended monitor region 200(F) which is a predetermined region surrounding the monitor region 200. The motor vehicle peripheral monitoring apparatus 50 comprises, as shown in FIG. 10, image input means 10, the CCD camera 11, the monitor region extension member 12, a signal acquisition unit 20, a back gear detection sensor 21, data processing means 30 and a display alarm unit 40.

As is apparent from FIG. 11, for the motor vehicle peripheral monitoring apparatus 50, the monitor region 200 is a region extending far from the vicinity of the rear of the motor vehicle, and the extended monitor region 200(F) is a rear far region 200(C) apart from the monitor region 200.

Thus, in the form of clear and sharp images there can be obtained the images of the monitor region 200 which is a region requiring greatest attention when a motor vehicle travels backward. Accordingly, this construction will contribute to an improvement in safety when the motor vehicle travels backward.

In this instance, preferably, the upper image passage part 122 of the monitor region extension member 12 is so arranged that the image input means 10 can receive images of at least the rear far region 200(C).

By providing such an upper image passage part 122, it become possible to secure the angle of incidence of the images of the rear far region 200(C) relative to the field angle $\theta_{MIN}$ at the central portion and to decrease the angle of incidence of the images of the rear far region 200(C) relative to the field angle $\theta_{MAX}$ in the diagonal direction. Furthermore, there can be obtained monitor images which are highly distinguishable with substantially no difference in a sense of distance between the actual monitor region 200 and a picture of the monitor region 200 derived in the form of output of the CCD camera 11 through the compensation of the horizontal optical distortion. As a result of this, the driver can be given an improved viewing environment.

The prism structural element $122_{strct}$ of the upper image passage part 122 associated with the image input means 10 (specifically, the CCD camera 11, see FIG. 8) has a convexedly or conically curved surface $122_{srfc}$ whose prism apical angle $\theta_w$ is decreased toward the extremity of the member in a predetermined rate as described in connection to FIG. 3.

By providing such an upper image passage part 122 having the prism structural element $122_{strct}$ with convexedly or conically curved surface $11_{srfc}$, there is ensured an acquisition of images with less optical distortion over a wider monitor region 200.

Furthermore, it becomes possible for the thus acquired images with less optical distortion to secure the angle of incidence of the field angle $\theta_{MIN}$ at the central position and to decrease the angle of incidence of the field angle $\theta_{MAX}$ in the diagonal direction.

As a result, there is ensured an extension of the monitor region 200 with no optical distortion as well as a provision of satisfactory monitor images free from any shaded portion arising from total reflection, so that the driver can be given an improved viewing environment.

Furthermore, there can be obtained monitor images which are highly distinguishable with substantially no difference in a sense of distance between the actual monitor region 200 and a picture of the monitor region 200 derived in the form of output of the CCD camera 11 through the compensation of the horizontal optical distortion. As a result of this, the driver can be given an improved viewing environment.

Similarly, the upper image compression part 124 is preferably arranged so as to optically compress images of regions continuous with the rear far region 200(C) but excluding a rear near region 200(A), to input into the image input means 10.

By arranging the upper image compression part 124 in this manner, it becomes possible to secure the angle of incidence of images of a wider area extending from the rear far region 200(C) up to the rear near region 200(A), relative to the field angle $\theta_{MIN}$ at the central position and to decrease the angle of incidence of images of a wider area extending from the rear far region 200(C) up to the rear near region 200(A), relative to the field angle $\theta_{MAX}$ in the diagonal direction. As a result, there is ensured an extension of the monitor region 200 with no optical distortion as well as a provision of satisfactory monitor images free from any shaded portion arising from total reflection, so that the driver can be given an improved viewing environment.

Furthermore, there can be provided continuous monitor images with no blind spot, with the result that an improved viewing environment can be given to the driver.

The cylindrical structural element 124$_{strct}$ of the upper image compression part 124 associated with the image input means 10 (the CCD camera 11) is so configured as to have a concavely curved surface 124$_{srfc}$ on the side of the image input means 10 as described hereinabove (see FIG. 8).

Incidentally, such a monitor region extension member 12 may be made of an optically transparent material (specifically, glass).

By disposing at the front part of the CCD camera 11 such an upper image compression part 124 having the cylindrical structural element 124$_{strct}$ with the concavely curved surface 124$_{srfc}$, there is ensured an acquisition of images with less optical distortion over a wider monitor region 200.

Moreover, it becomes possible for the thus acquired images with less optical distortion to secure the angle of incidence of the field angle $\theta_{MIN}$ at the central position and to decrease the angle of incidence of the field angle $\theta_{MAX}$ in the diagonal direction.

As a result, there is ensured an extension of the monitor region 200 with no optical distortion as well as a provision of satisfactory monitor images free from any shaded portion arising from total reflection, so that the driver can be given an improved viewing environment.

The image input means 10 are mounted on a motor vehicle 100 and make use of the monitor region extension member 12 as optical image forming means when acquiring optical images of the monitor region 200. The image input means 10 are based on the CCD camera 11 and serve to form optical images of the extended monitor region 200(F) in addition to optical images of the monitor region 200 which have been input from the monitor region extension member 12, to generate motor vehicle peripheral monitor information 10a.

The CCD camera 11 is provided with a lens 112A and an image plane not shown. The CCD camera 11 forms the images within the field angle range defined by the lens 112A onto the image plane and directly outputs the motor vehicle peripheral monitor information 10a to the monitor 42.

The monitor region extension member 12 is disposed immediately in front of the lens 112A and serves to extend the region of images input into the CCD camera 11.

By providing such a monitor region extension member 12, it becomes possible to input images which are highly distinguishable into the CCD camera 11. As a result of this, the images in the predetermined regions 200(A) to 200(C) will result in clear and sharp images. Thus, there is ensured an acquisition of images with no blind spot without impairing the clearness and sharpness of the compressed images.

The data processing means 30 function to monitor the occurrence of a trouble in the periphery of the motor vehicle 100 on the basis of the motor vehicle peripheral monitor information 10a.

By providing such image input means 10 and data processing means 30, there is ensured an extension of the monitor region 200 with no optical distortion as well as a provision of satisfactory monitor images free from any eyesore, shaded portion arising from total reflection, so that the driver can be given an improved viewing environment. Furthermore, by optically continuously coupling the upper image passage part 122 with the upper image compression part 124 there is ensured a provision of continuous monitor images free from any blind spot, so that the driver can be given an improved viewing environment.

The frame memory 13 is capable of acquiring the information of images formed on the image plane of the CCD camera 11, storing it temporarily and, In accordance with the a read-out command, outputting to the monitor 42 the motor vehicle peripheral monitor information 10a containing the thus stored image information.

The signal acquisition unit 20 includes a back gear detection sensor 21 which detects that the speed change gearing mechanism of the motor vehicle 100 is at the back gear to generate a detection signal, and serves to output to the data processing means 30 the detection signal issued upon the detection of back gear to activate the peripheral monitor control.

The back gear detection sensor 21 is mounted on the speed change gearing mechanism not shown and detects that the speed change gearing mechanism is at the back gear and generates a detection signal upon the detection of back gear.

The operation switch 22 is disposed at the driver's seat or the like and is in the form of a manual switch for allowing the driver to switch the device into operating or unoperating mode.

The provision of such a signal acquisition part 20 will facilitate the automatization of the peripheral monitor control, with the result that the driver can be given the motor vehicle peripheral monitoring apparatus 50 having an improved operativity.

The data processing means 30 comprises a CPU 31 which operates In accordance with the an operation program, a ROM 32 in which the operation program is stored, and a RAM 33 for temporarily storing information required for the operation of the CPU 31. By way of signal lines the CPU 31 is connected to the above-described image input means 10, signal acquisition unit 20 and display alarm unit 40 to perform a reception of the motor vehicle peripheral monitor information 10a from and to the image input means 10, a reception and impartment of signals from and to the signal acquisition unit 20, and a reception and impartment of signals from and to the display alarm unit 40.

The display alarm unit 40 includes a speaker 41 and a display 42, and serves to output a buzzer sound or a voice guidance on the basis of a drive signal output from the data processing means 30 and display a relative position between an obstacle and the motor vehicle 100 or a message to the driver.

The speaker 41 outputs a buzzer sound or an voice guidance therefrom on the basis of a drive signal output from the CPU 31 of the data processing means 30. The display 42 displays on the basis of a drive signal from the CPU 31 a relative position between the obstacle and the motor vehicle or a message to the driver.

By providing such a display alarm unit 40, there is promptly and simply ensured the finding of an obstacle in the peripheral monitoring operation and the identification of the relative positions.

As a result of this, the burden of monitoring of the driver can be alleviated so that the driver can be given an operative environment allowing an accurate peripheral monitoring.

A specific example of the motor vehicle peripheral monitoring apparatus 50 will now be described with reference to FIG. 11.

The motor vehicle peripheral monitoring apparatus 50 is fixedly secured to the rear part of the motor vehicle 100 (FIG. 11 demonstrates a bus which is a large-sized vehicle) at an angle of depression θ relative to a normal line of the ground.

Thus, in the case where no monitor region extension member 12 is arranged, in other words, only the lens 112A is provided, there is imaged a monitor region 200 for the motor vehicle 100 extending from the rear near region up to the rear far region.

Then, the monitor region extension member 12 having the above-described structure is positioned immediately in front of the CCD camera 11, to extend the monitor region 200.

That is, by positioning the monitor region extension member 12 immediately in front of the CCD camera 11 in such a manner that the upper image passage part 122 is located at the upper side, the monitor region 200 by the CCD camera 11 is extended from the above-described monitor region 200 to the rear far side, resulting in a monitor region 200 containing a region outside the monitor region 200.

With the monitor region 200 extended, the images of the rear near region 200(A) of the motor vehicle 100 pass optically through the planar part 126 and hence are acquired in the form of clear and sharp images similar to the case of only the lens 112A, whereas the images of the rear far region 200(C) extended by the monitor region extension member 12 pass optically through the upper image passage part 122 and hence are also acquired in the form of clear and sharp images. It is to be noted that this rear far region 200(C) contains a region in the rear horizontal direction of the motor vehicle 100.

The images of the second predetermined region 200(B) between the rear near region 200(A) and the rear far region 200(C) pass optically through the upper image compression part 124, and hence result in images which are seamlessly continuous with one another between the rear near region 200(A) and the rear far region 200(C) and are wholly optically compressed.

In the display images on the display 42, the images of the rear near region 200(A) and of the rear far region (a region in the rear horizontal direction) 200(C) both regions requiring driver's greatest attention can result in clear and sharp images, whereas the images of the second predetermined region 200(B) between the two regions are displayed without being impaired.

Then, when the back gear detection sensor 21 of the signal acquisition unit 20 detects a shift position at the back gear of the motor vehicle 100 in the actual operation, or when "operative" mode is selected by the operation switch 22, the images of the monitor region 200 are acquired by the image input means 10, and the thus acquired images are displayed on the display 42 of the display alarm unit 40.

In the process of displaying the images of the monitor region 200 in this manner, if there exists an obstacle such as a walker described above within the rear far region 200(C) or the rear near region 200(A) of the motor vehicle, the speaker will output a buzzer sound or a voice guidance to alert the driver to a danger. At that time, the relative distance between the obstacle 300 and the motor vehicle 100 may be found through the image processing or alternatively may be measured by a distance sensor not shown.

Although in the monitor region extension member 12 provided with the upper image passage part 122 and the upper image compression part 124 for optically compressing the images as described above, the compressed images which have passed though the upper image compression part 124 in an optically compressed manner can result in images which are relatively clear and sharp by increasing the radius R (see FIG. 1) of the upper image compression unit 124, the thus increased radius R would lead disadvantageously to an increased proportion of the compressed images within the entire images of the monitor region 200.

Experimentally, with a combination of a ⅓ inch CCD and a lens of 2.1 mm in focal length, satisfactory images were obtained when the radius R is 30 mm.

Although in this embodiment the extended monitor region 200(F) was a rear far region of the motor vehicle, the present invention is not intended to be limited to this. For instance, the extended monitor region 200(F) may be set as a side region of the monitor region 200. In this case, passersby passing through a shoulder of the road, bicycles, motorcycles, etc., can also be monitored.

Although the monitor region extension member 12 in this embodiment was comprised of a transparent material formed into a predetermined shape, it may made of a prism sheet. In this case, the prisms can be arranged in a slit-like manner. This will provide an advantage by virtue of which the monitor region extension member 12 can be thinned.

What is claimed is:

1. A monitor region extension member which is an optical member for acquiring, when image input means are used to acquire optical images of a monitor region surrounding a motor vehicle, optical images of an extended monitor region which is a predetermined region surrounding the monitor region, in addition to the optical images of the monitor region, said monitor region extension member comprising:

an upper image passage part in the form of a prism disposed at the upper portion of said member, for optically refracting images of a first predetermined region containing at least said extended monitor region to acquire optical images of said first predetermined region; and an upper image compression member in the form of a cylindrical prism disposed continuously with said upper image passage part, for optically refracting images of a second predetermined region continuous with said first predetermined region to acquire optical images of said second predetermined region.

2. A monitor region extension member according to claim 1, wherein said upper image passage part includes a prism structural element of substantially a semi-conical shape whose prism apical angle becomes the maximum angle at the center of said member and is decreased toward the extremity of said member from the center of said member.

3. A monitor region extension member according to claim 2, wherein said prism apical angle is a predetermined function in which the sector angle of said prism structural element is a variable, said prism apical angle being decreased accordingly as said sector angle increases.

4. A monitor region extension member according to claim 1, wherein said upper image compression part includes a cylindrical structural element having a curved surface whose angle is set to be smaller continuously from said prism apical angle of said upper image passage part.

5. A monitor region extension member according to claim 4, wherein said curved surface formed on said upper image compression part is of a cylindrical structure in the form of a cylindrical surface whose prism apical angle is set to be smaller continuously from the prism apical angle of said image passage part.

6. A motor vehicle peripheral monitoring apparatus using as optical image forming means said monitor region extension member according to claim 1, said motor vehicle peripheral monitoring apparatus comprising:

image input means mounted in a motor vehicle, for picking up by way of said monitor region extension member serving as optical image forming means, when acquiring optical images of said monitor region, optical images of said extended monitor region in addition to optical images of said monitor region input from said monitor region extension member, to generate motor vehicle peripheral monitor information; and     data processing means for monitoring the occurrence of an obstacle in the periphery of a motor vehicle on the basis of said motor vehicle peripheral monitor information.

7. A motor vehicle peripheral monitoring apparatus according to claim 6, wherein said monitor region is a region extending far from the rear vicinity of said motor vehicle, with said extended monitor region being a rear far region outside said monitor region, and wherein said upper image passage part is arranged such that images of at least said rear far region are input into said image input means, and wherein upper image compression part is arranged such that it optically compresses images of regions continuous with said rear far region but excluding said rear near region to input them into said image input means.

8. A motor vehicle peripheral monitoring apparatus according to claim 7, wherein said prism structural element of said upper image passage part on the side of said image input means includes substantially convexedly or conically curved surface whose prism apical angle is decreased toward the extremity of said member in a predetermined rate.

9. A motor vehicle peripheral monitoring apparatus according to claim 7, wherein said cylindrical structural element of said upper image compression part on the side of said image input means includes a curved surface concaved toward said image input means.

10. A motor vehicle peripheral monitoring apparatus according to claim 9, further comprising:

a back gear detection sensor for detecting that a speed change gearing mechanism is at a back gear position to generate a detection signal; and     a signal acquisition unit for outputting, upon a detection of the back gear position, the detection signal to said data processing means to urge the peripheral monitor control.

11. A motor vehicle peripheral monitoring apparatus according to claim 9, further comprising:

a display alarm unit for generating a buzzer sound or a voice guidance on the basis of a drive signal output from said data processing means and for displaying a relative position between an obstacle and the motor vehicle or a message to the driver.

* * * * *